United States Patent
Agrawal

(10) Patent No.: US 10,121,088 B2
(45) Date of Patent: Nov. 6, 2018

(54) SYSTEM AND METHOD FOR STRAIGHTENING CURVED PAGE CONTENT

(71) Applicant: ADOBE SYSTEMS INCORPORATED, San Jose, CA (US)

(72) Inventor: Ram Bhushan Agrawal, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1 day.

(21) Appl. No.: 15/173,381

(22) Filed: Jun. 3, 2016

(65) Prior Publication Data
US 2017/0351931 A1    Dec. 7, 2017

(51) Int. Cl.
| | |
|---|---|
| *G06K 9/00* | (2006.01) |
| *G06K 9/32* | (2006.01) |
| *G06K 9/40* | (2006.01) |
| *H04N 1/387* | (2006.01) |
| *G06K 9/36* | (2006.01) |

(52) U.S. Cl.
CPC ............ *G06K 9/3283* (2013.01); *G06K 9/40* (2013.01); *H04N 1/3878* (2013.01); *G06K 2009/363* (2013.01)

(58) Field of Classification Search
CPC .... G06K 9/3283; G06K 9/342; G06K 9/3208; G06K 9/40; G06K 9/346; G06K 2009/363; H04N 1/3878
USPC ........ 382/100, 154, 106, 290; 345/418, 419, 345/427; 348/42, 46, 47, 48
See application file for complete search history.

(56) References Cited

U.S. PATENT DOCUMENTS

| | | | | |
|---|---|---|---|---|
| 6,954,290 | B1* | 10/2005 | Braudaway | G06K 9/3283 |
| | | | | 358/3.26 |
| 7,330,604 | B2* | 2/2008 | Wu | G06K 9/3283 |
| | | | | 382/216 |
| 7,697,776 | B2* | 4/2010 | Wu | G06K 9/3283 |
| | | | | 358/3.27 |
| 8,675,969 | B2* | 3/2014 | Xu | H04N 1/00681 |
| | | | | 358/474 |
| 9,305,211 | B2* | 4/2016 | know et al. | G06K 9/00442 |
| | | | | 382/195 |
| 2014/0247470 | A1* | 11/2014 | hunt et al. | H04N 1/00251 |
| | | | | 382/302 |

OTHER PUBLICATIONS

Computer Vision Demonstration Website. Retrieved from the Internet Jul. 28, 2017 at <https://web.archive.org/web/20160304232529/http://users.ecs.soton.ac.uk/msn/book/new_demo/thresholding>. 2 pages.

(Continued)

*Primary Examiner* — Sheela C Chawan
(74) *Attorney, Agent, or Firm* — Shook, Hardy & Bacon, L.L.P.

(57) ABSTRACT

The page straightening system includes a word module to determine an enclosing quadrilateral of each connected component of curved page content. Further, a line module in the page straightening system is configured to form text lines by joining enclosing quadrilaterals based on a reading order. Subsequently, a correction module in the page straightening system is configured to generate straightened content from the curved content based on the text lines. As such, the page straightening system can automatically straighten curved page content.

17 Claims, 13 Drawing Sheets

(56) References Cited

OTHER PUBLICATIONS

Wikipedia contributors. (Jan. 25, 2016). Connected-component labeling. In Wikipedia, The Free Encyclopedia. Retrieved 16:16, Jul. 27, 2018, from https://en.wikipedia.org/w/index.php?title=Connected-component_labeling&oldid=701641456.

Wikipedia contributors. (Feb. 21, 2016). Dilation (morphology). In Wikipedia, The Free Encyclopedia. Retrieved 16:16, Jul. 27, 2018, from https://en.wikipedia.org/w/index.php?title=Dilation_(morphology)&oldid=706095031.

* cited by examiner

SYSTEM AND METHOD FOR STRAIGHTENING CURVED PAGE CONTENT

BACKGROUND

With the proliferation of mobile devices that include integrated cameras, more and more people have begun to utilize these mobile devices as portable document scanners. With a good camera on a mobile device, people can scan or capture items as images or portable document format (PDF) files. It is more convenient for people to scan things like documents, reports, receipts, posters, or anything else utilizing just a smartphone, rather than a more traditional scanning device, such as, for example, a sheet feed scanner. Once a document has been scanned, optical character recognition (OCR) can be applied to the scanned document if desired. The resulting product can be shared digitally via email, fax, online exchange, etc. with other individuals. In other words, nowadays a handheld device in pocket can function in a similar manner as a traditional scanner.

However, for various reasons, scanning a document utilizing a handheld device can be prone to generate curved page content. In some instances, this is due to physically curved content, such as a page of a thick book. In other instances, this is due to complex lighting conditions or hand shaking. Some applications, such as Acrobat Document Cloud (DC)® (available from Adobe Corporation of San Jose, Calif.), provide a way to open these document images and can also enhance the quality of the document within the image. In instances where the text of the document is curved (e.g. after taking picture of a page of a thick book) in the document image, traditional applications are not able to fully correct this curvature. As such, the resulting image, even after applying correction, still includes an undesired "waviness" or "curl" to the text, which can make the scanned document difficult to read or for further processing.

SUMMARY

Embodiments of the present invention relate to systems and methods for automated straightening of curved page content within a document image. As such, embodiments of the present disclosure relate to a page straightening system and related processes for straightening curved page content. As described in embodiments herein, technical solutions are provided to automatically detect the curvature of the text and realign the text to straighten it with little to no user interaction.

In this regard, a page straightening system uses a word module to identify connected components (e.g., words) of curved page content. Once these connected components are identified, an enclosing quadrilateral of each connected component can be generated. Further, the page straightening system can utilize a line module to identify text lines by joining the enclosing quadrilaterals based on a reading order of the text. Finally, the page straightening system uses a correction module to generate straightened content from the curved content based on identified text lines.

In some embodiments, the page straightening system can determine a grid with straight vertical lines and curved horizontal lines conforming to the identified text lines within the curved page content. From this grid, the page straightening system can conduct piecewise perspective correction to generate straightened page content from the curved page content.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

In this disclosure, technical solutions are provided to automatically detect the curvature of text within an image and straighten it with little to no user interaction. To this end, embodiments of the present disclosure include a page straightening system and related processes for straightening curved page content. As described in reference to illustrative embodiments, the page straightening system can automatically detect the curvature of the text and straighten the curved text in response to a single command issued by a user.

In various embodiments, given curved page content in an image, the page straightening system converts the image into a binarized form (e.g., monochrome). Non-text content is removed from the binarized form. Further, the page straightening system applies a horizontal dilation filter to enable the letters within each word of the curved page content to fuse together to become a single connected component. A horizontal dilation filter dilates the letters in a horizontal direction. For each connected component, the page straightening system calculates a slope for the connected component, e.g., based on starting and ending clusters of pixels within each connected component. Further, the page straightening system determines an enclosing quadrilateral for each connected component. The page straightening system also sorts these connected components based on a reading order and identify text lines from the connected components. The reading order is how a reader would naturally follow the content, e.g., from left to right and then from top to bottom.

Based on the identified text lines, the page straightening system determines a grid having straight vertical lines and curved horizontal lines that conform to the curved page content. Finally, the page straightening system performs a piecewise perspective correction based on the grid, thus automatically straightening the curved text. A piecewise perspective correction is to perform perspective control for individual quadrangle in the grid, so that the content in each quadrangle will be individually straightened.

As a result, a user simply takes a picture of a document with a mobile device to capture a "scan" of the document. If the scan includes curved page content, the user issues a command to the page straightening system, e.g., embodied as an app in the mobile device, and the page straightening system automatically straightens the curved page content. Thereafter, a document image including straightened page content can be presented to the user or to be shared with others. While discussed predominantly herein in reference to curved page content, it will be appreciated that the teachings herein can also be applicable to angled page content, e.g., page content that is not fully horizontal within a document image, in a similar fashion.

Figure 1:
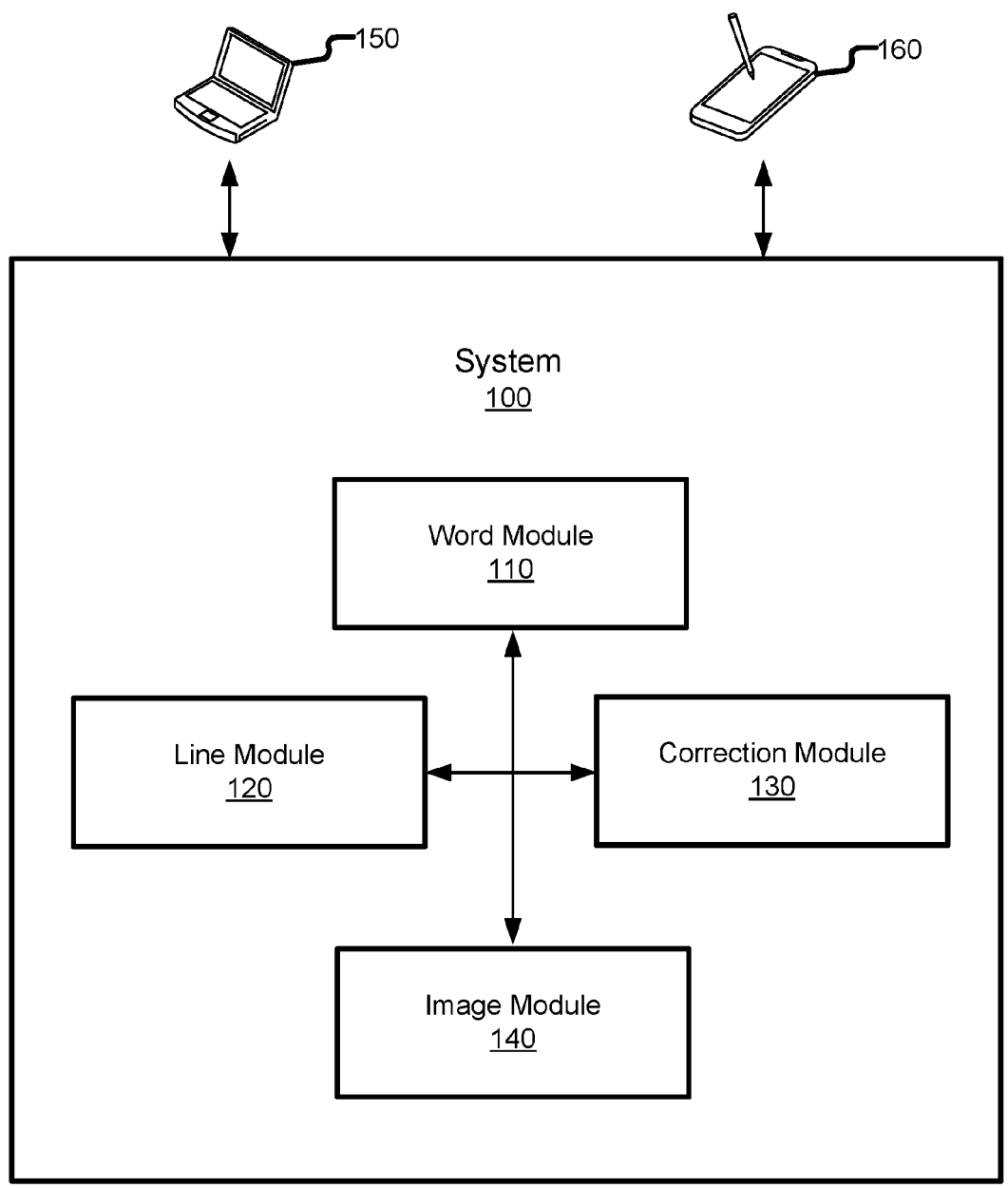
FIG. 1 is a schematic diagram illustrating an example implementation of a page straightening system, incorporating aspects of the present disclosure, in accordance with various embodiments.

Referring now to FIG. 1, a schematic diagram illustrates an example implementation of a page straightening system 100 in accordance with various embodiments. System 100 enables a user to straighten curved content via a user device, e.g., computer 150 or mobile device 160. As such, system 100 automatically straightens the curved content to generate flat-looking content, e.g. parallel horizontal text lines.

As illustrated in FIG. 1, system 100 includes word module 110, line module 120, correction module 130, and image module 140, operatively coupled with each other. In some embodiments, system 100 is a server computing device and/or service, such as a server and/or a service provided in a computing cloud, and interacts with user computing devices (e.g., computer 150 and mobile device 160). In alternative embodiments, system 100 can be integrated with a user computing device, such as computer 150 and mobile device 160, or any other type of user device. In a desktop computing device, system 100 can be embodied, for example, as a desktop application. In a mobile device, system 100 can be embodied, for example, as a mobile app. Regardless of the computing platform on which system 100 is implemented, system 100 can be embodied as a hardware component, a software component, or any combination thereof for straightening curved content. In some embodiments, system 100 can be a distributed system, for example, each of word module 110, line module 120, correction module 130 and image module 140 can be distributed across any number of servers.

User devices (e.g., computer 150 and mobile device 160) can be configured to communicate with system 100 via, e.g., an internal bus or one or more wireless and/or wired networks. The internal bus could be an internal data bus, memory bus, system bus or Front-Side-Bus, which connects all the internal components of a computing device. These wireless or wired networks include public and/or private networks, such as, but not limited to, local area networks (LANs), wide area networks (WANs), the Internet, or any combination thereof. In some embodiments, these wireless networks include one or more wireless personal area networks (WPANs), wireless local area networks (WLANs), wireless metropolitan area networks (WMANs), or wireless wide area networks (WWANs). In some embodiments, these wireless networks include cellular networks, for example, Wideband Code Division Multiple Access (WCDMA), Global System for Mobile Communications (GSM), Long Term Evolution (LTE), and the like. It will be appreciated that any combination of the above discussed networks can be utilized without departing from the scope of this disclosure. In addition, the above discussed networks are merely meant to be illustrative in nature. The manner in which the user devices communicate with system 100 should not be viewed as limiting of this disclosure.

In various embodiments, word module 110 identifies connected components (e.g., words) of curved content. From these connected components, word module 110 determines an enclosing quadrilateral for each of the identified connected components. To accomplish this, word module 110 initially converts the image into a grayscale representation. Word module 110 can then convert this grayscale representation into a binarized image. This can be accomplished through any number of mechanisms, including, for example, hysteresis binarization.

Word module 110 can then utilize one or more horizontal dilation filters applied to the binarized image to make each glyph (e.g., character) within a word fuse together to become one connected component. Because it could make later identification of text lines difficult, it is not desirable to cause different text lines to fuse together. As such, the binarized image will be dilated in the horizontal direction and not in the vertical direction, so that glyphs within a single word can connect with each other. In some languages, e.g., traditional Chinese, the text is written in a vertical form. In that case, after appropriate language detection, the image may be rotated 90 degrees so that the horizontal dilation filters can still be applied to connect glyphs in the same word.

Non-text content within the image, or scan, of the document can make it difficult to detect text boundaries within the image. As such, word module 110 can also be configured to remove, non-text content from the binarized form. This can be accomplished after the binarization process, via a connected component analysis (CCA) and heuristics, performed by word module 110, to remove non-text content from the binarized image. Non-text content can include relatively small content (e.g., background noise), relatively large content (e.g., shadows, image content, etc.), or any other content that is not part of the text captured within the image. Connected component analysis is a standard technique in image processing, and this process is just one method for removing non-text content. Any other techniques for removing non-text content can also be used without departing from the scope of this disclosure.

Once the connected components are identified and the non-text content has been removed, word module 110 will determine an enclosing quadrilateral (e.g., a minimum enclosing quadrilateral) and an associated slope of each connected component. This can be accomplished, for example, by analyzing the left-most and right-most 10% of each connected component to determine an enclosing rectangle (e.g., a minimum enclosing rectangle) of the left-most and right-most portions (e.g., pixels) of the connected component. In such an example, the enclosing quadrilateral for the connected component can be formed by joining the left-most and right-most enclosing rectangles. The slope of a connected component can be determined by connecting the vertical midpoint of the left-most enclosing rectangle with a vertical mid-point of the right-most enclosing rectangle.

Page straightening system 100 utilize line module 120 to identify text lines within the curved content. This can be accomplished by joining the enclosing quadrilaterals based on an identified reading order of the enclosing quadrilaterals. In one embodiment, line module 120 determines a reading order by first sorting all the enclosing quadrilaterals in a left-to-right and top-to-bottom fashion, e.g., based on their top-left corners. Each enclosing quadrilaterals, and thereby the word within the enclosing quadrilateral, can then be assigned to a respective text line. If an enclosing quadrilateral can be assigned to an existing text line based on joining criteria, then the enclosing quadrilateral will join the existing text line. If, on the other hand, an enclosing quadrilateral cannot be assigned to an existing text line, then the enclosing quadrilateral will be assigned to a new text line. If there are broken text lines, then line module 120 merges consecutive text lines that are within the same reading line.

Figure 5:
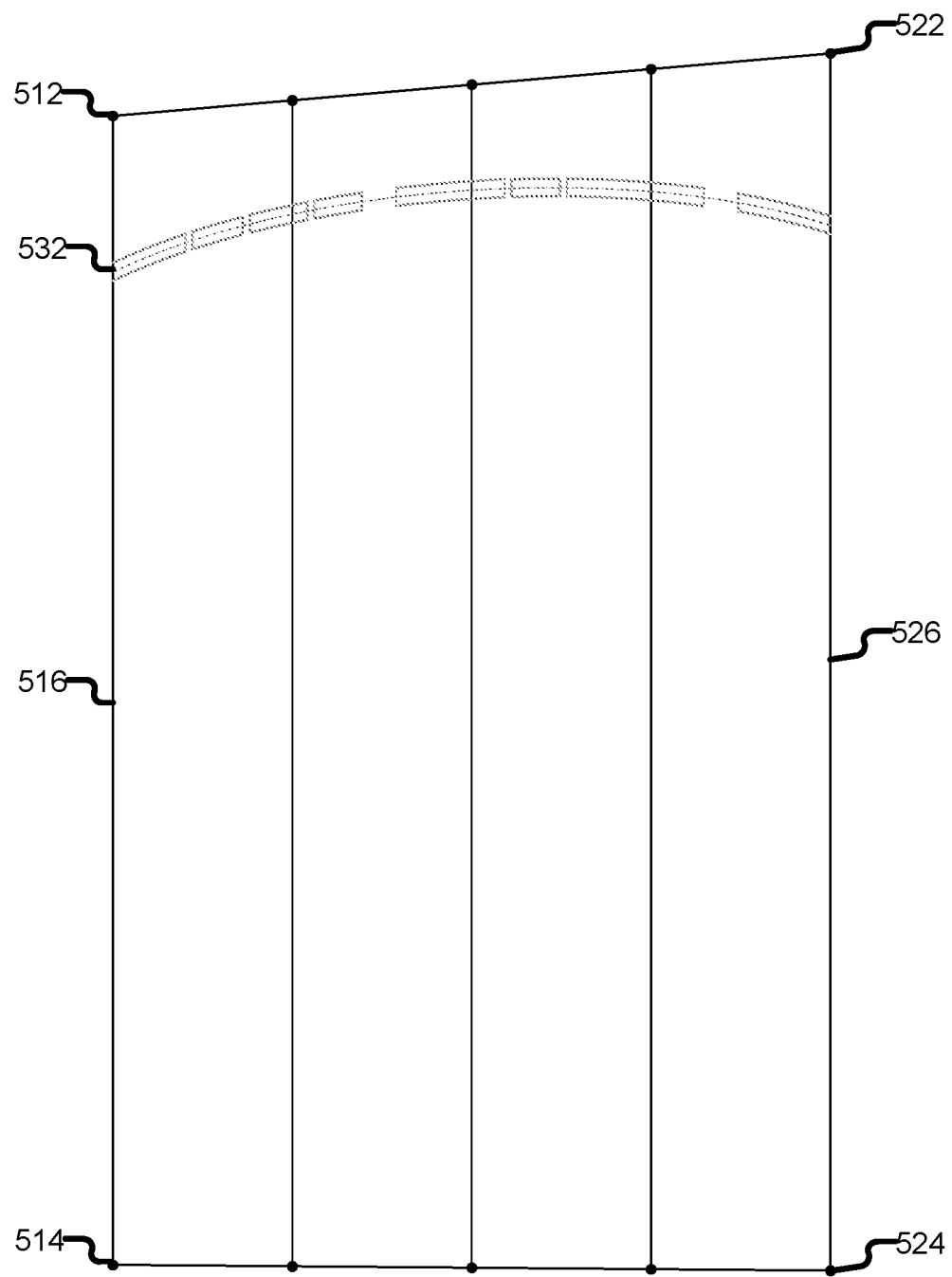
FIG. 5 is a schematic diagram illustrating an example for forming vertical lines for a grid, incorporating aspects of the present disclosure, in accordance with various embodiments.
Figure 6:
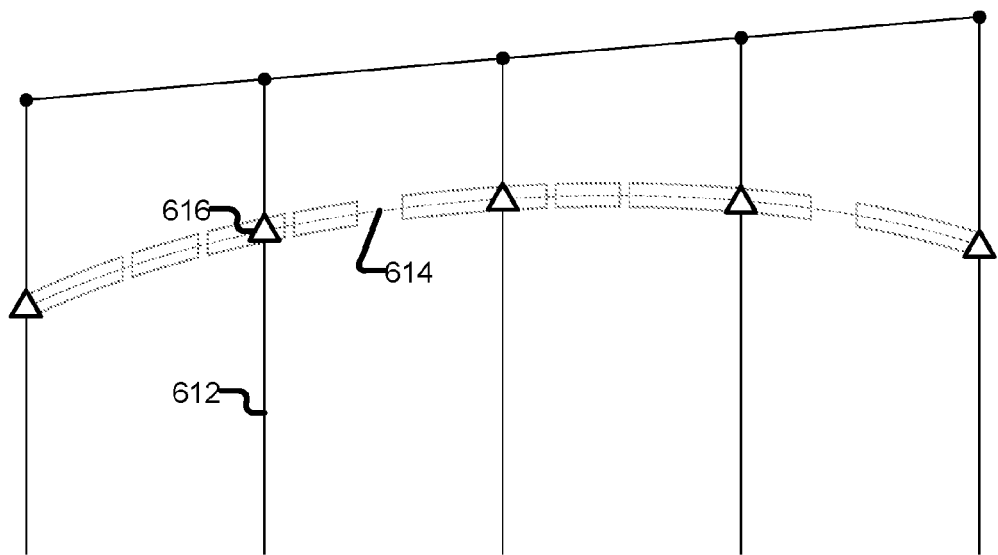
FIG. 6 is a schematic diagram illustrating an example for forming curved horizontal lines for the grid, incorporating aspects of the present disclosure, in accordance with various embodiments.
Figure 6:
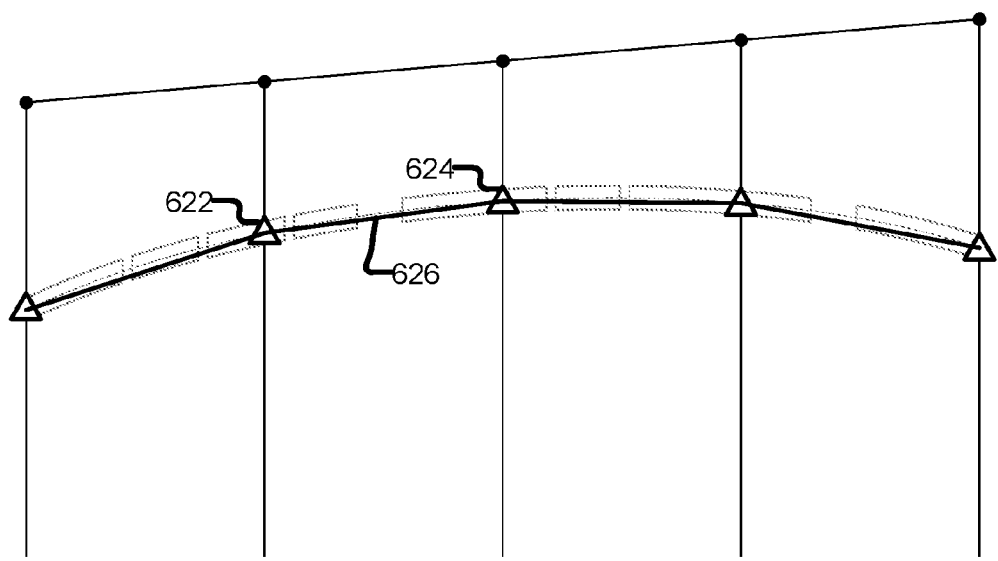
Figure 7:
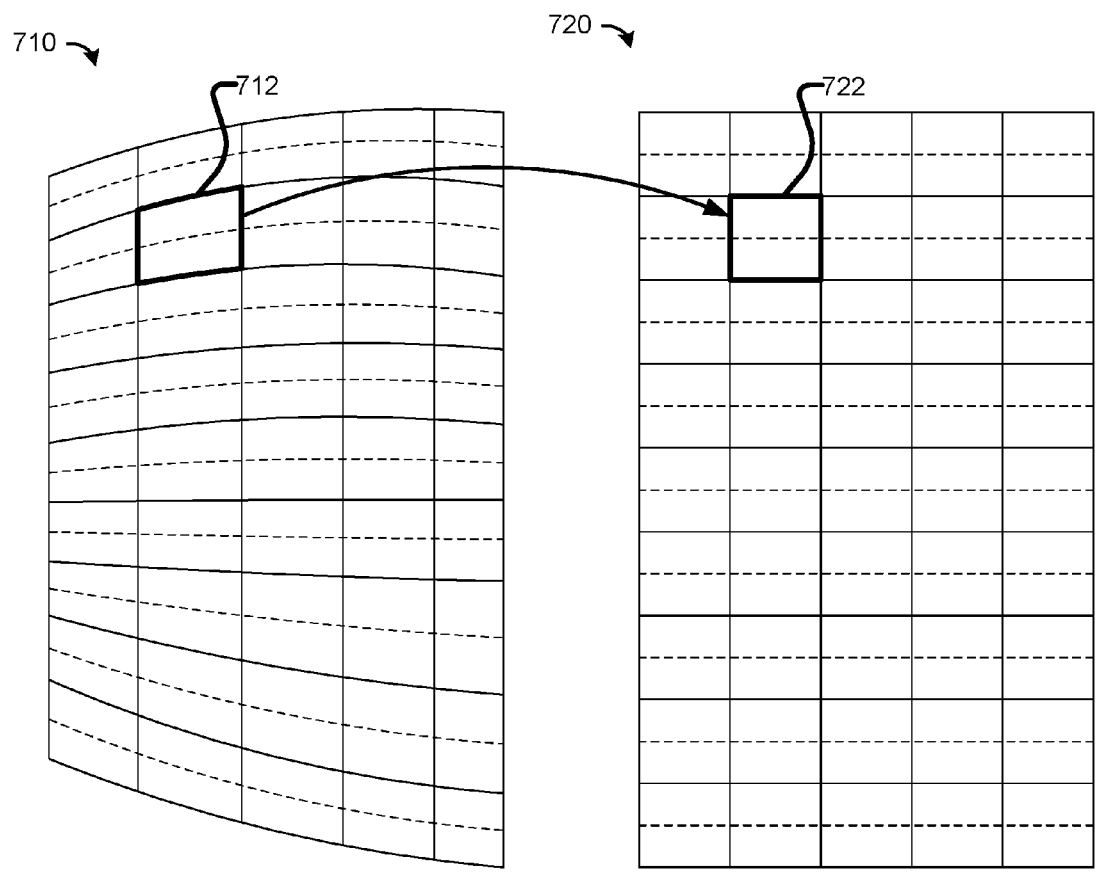
FIG. 7 is a schematic diagram illustrating an example for mapping quadrilaterals between two grids, incorporating aspects of the present disclosure, in accordance with various embodiments.

Finally, page straightening system 100 utilizes correction module 130 to generate straightened content from the curved content based on the identified text lines. To accomplish this, correction module 130 determines a grid with straight vertical lines and curved horizontal lines conforming to the curved content. Such a grid is depicted in FIGS. 5-7. From this grid, a piecewise perspective correction may be applied to the curved content to generate straightened content from the curved content. Such a piecewise perspective correction is discussed in further detail below.

To determine the grid for piecewise perspective correction, correction module 130 connects midpoints of an end of one enclosing quadrilateral with a start of a horizontally adjacent enclosing quadrilateral. This can be done for each enclosing quadrilateral within the same text line. The result of this is to form a continuous curve for the entire text line. When needed, to obtain the continuous curve for the entire text line, correction module 130 may extrapolate a curve based on the above. Further, correction module 130 utilizes line smoothing techniques on these curves, e.g., utilizing a moving average, to smooth the continuous curve.

Correction module 130 estimates the width of the text content, and divide the text content into a number of vertical compartments, e.g., via the straight vertical lines of the grid. The number of straight vertical lines may be selected based on any suitable criteria, such as, for example, the size of the page, heuristically determined, or manually set by the user. The previously determined continuous curves for respective text lines will intersect with these vertical lines. The resulting intersection points provide the definition of new curves for each of the text lines, e.g., by connecting these intersections points to form curved horizontal lines for the grid. Such a new curve is depicted in FIG. 6, discussed in detail below. Finally, correction module 130 maps each quadrilateral formed in the grid, and the connected component, or word contained therein, to respective rectangles on a rectangle grid, e.g., a grid having straight vertical lines and straight horizontal lines. This mapping can be accomplished based on perspective mapping. Resultantly, the curved content is straightened.

In some embodiments, image module 140 is to take as input images from an image capture device, e.g., a camera on a mobile device. In various embodiments, image module 140 saves the straightened content to a new image or other format, e.g., a PDF file.

In other embodiments, system 100 can be implemented differently than that depicted in FIG. 1. As an example, word module 110 can be combined with line module 120 to form a comprehensive analysis module to process the curved content before correction performed by correction module 130. In some embodiments, components depicted in FIG. 1 have a direct or indirect connection not shown in FIG. 1. In some embodiments, some of the components depicted in FIG. 1 are divided into multiple modules. As an example, correction module 130 can be divided into separate modules for grid formation and perspective correction. Further, one or more components of system 100 can be located across any number of different devices and/or networks. As an example, image module 140 can be implemented as an independent subsystem in a data server.

Figure 2:
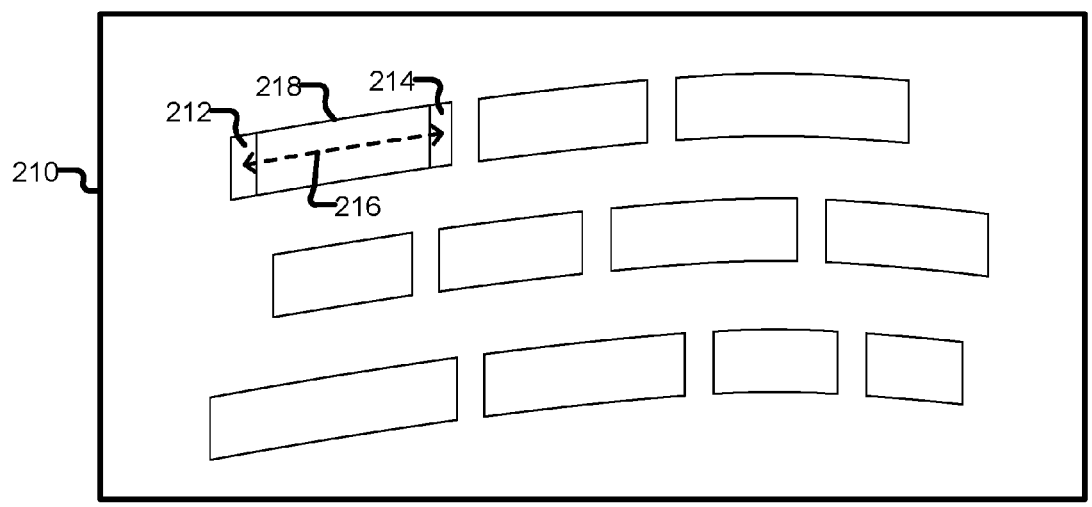
FIG. 2 is a schematic diagram illustrating an example for component analysis of curved page content, incorporating aspects of the present disclosure, in accordance with various embodiments.
Figure 2:
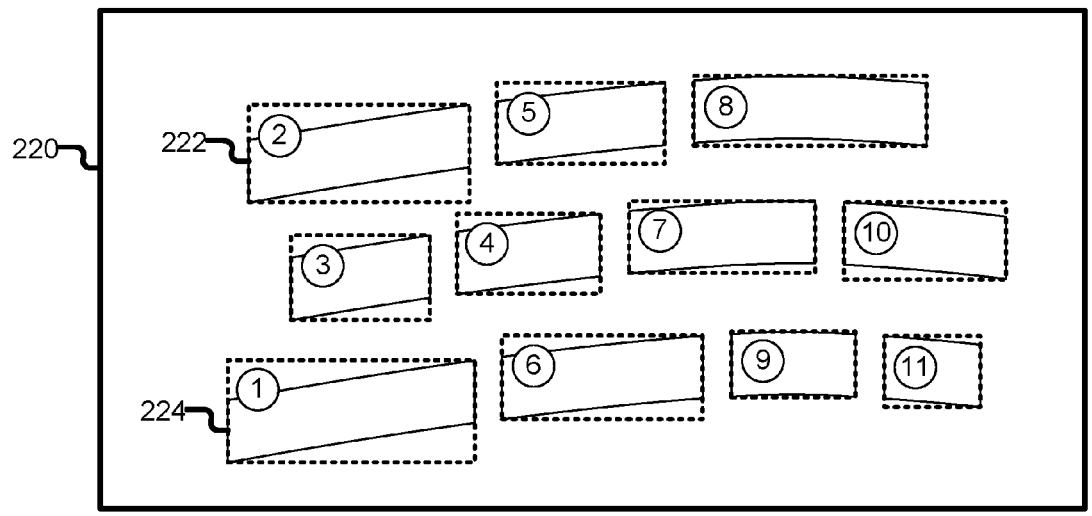

FIG. 2 is a schematic diagram illustrating an example connected component analysis of curved page content, incorporating aspects of the present disclosure, in accordance with various embodiments. As can be seen, curved content is depicted within box 210. Word module 110 of FIG. 1 can analyze connected components (e.g., words) of the curved content, to determine an enclosing quadrilateral for each connected component.

To determine an enclosing quadrilateral for a connected component, word module 110 analyzes the left-most and right-most portions of each connected component in some embodiments. A threshold (e.g., 10% of the width, or pixels, of the component) may be used to determine the portion of the connected component to be analyzed in determining the enclosing quadrilaterals. The threshold can be user selected, heuristically determined, determined based on a width of the connected component, or determined in any other suitable manner. Any suitable threshold can be utilized without departing from the scope of this disclosure.

For both the left-most and right-most portions, word module 110 determines a minimum enclosing rectangle, e.g., rectangle-start 212 and rectangle-end 214. After that, the slope of the connected component can be determined by joining the center points of rectangle-start 212 and rectangle-end 214 with line 216. The slope of line 216 is considered as the slope of the connected component. The slope of line 216 can be utilized for later processing, e.g., curve smoothing, etc. Further, the minimum enclosing quadrilateral 218 can be determined by joining rectangle-start 212 and rectangle-end 214 by straight lines, as depicted.

In box 220, in one embodiment, line module 120 first sorts all the connected components, depicted in rectangle shapes in this embodiment, in a left-to-right and top-to-bottom fashion, e.g., based on their top-left corners, before assigning those enclosing quadrilaterals to respective text lines. By way of example, connected component 224 is marked first because its top-left corner is the farthest left among all connected components. By the same token, connected component 222 is marked second because its top-left corner is the farthest left among the unmarked connected components. The remaining 3-11 are sorted in a similar manner. In this way, a sorted list of the connected components is generated, e.g., from 1 to 11 for box 220.

Figure 3:
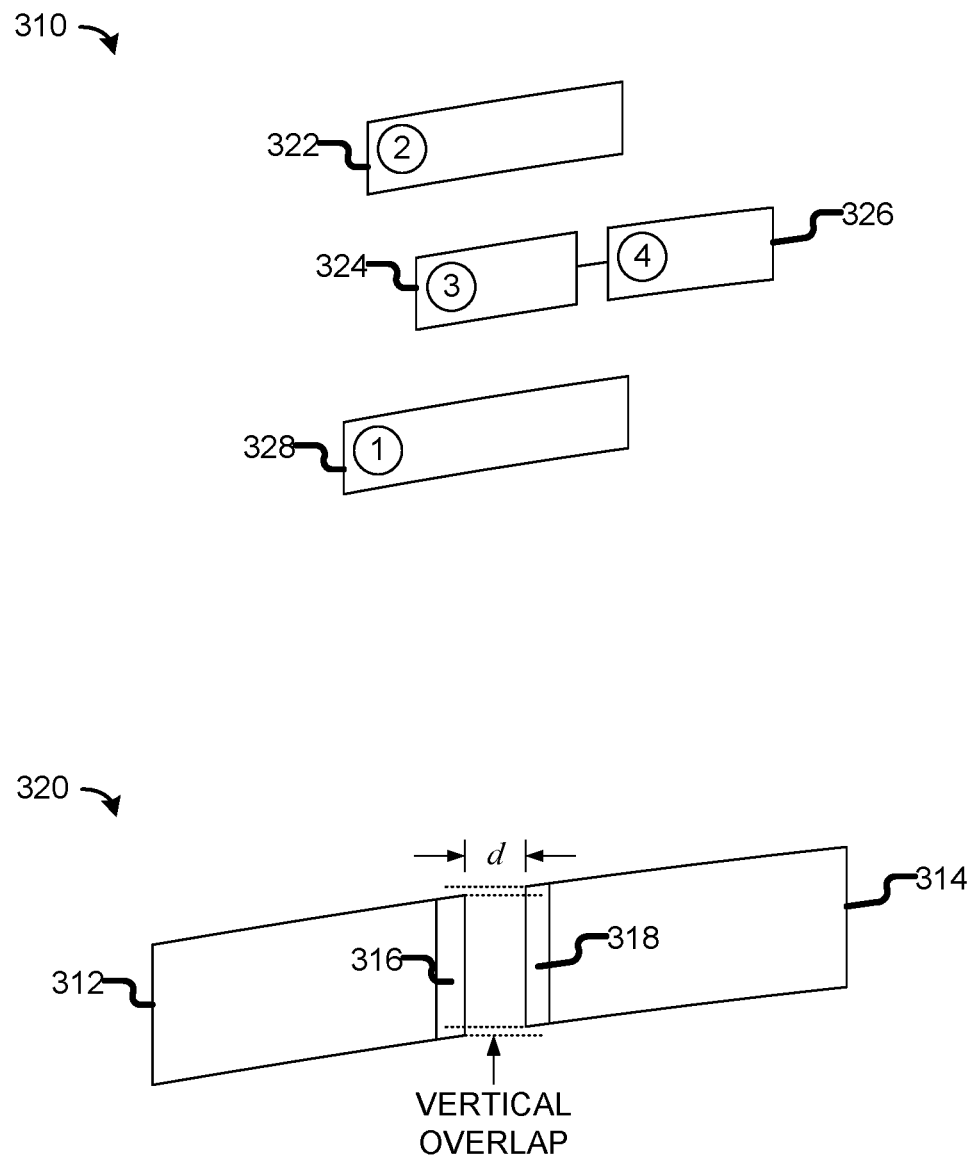
FIG. 3 is a schematic diagram illustrating an example for forming text lines for curved page content, incorporating aspects of the present disclosure, in accordance with various embodiments.

FIG. 3 is a schematic diagram illustrating an example of forming text lines for the curved content, in accordance with various embodiments of the present disclosure. To estimate the reading order of the connected components and join them with text line connectors to form the text lines, line module 120 of FIG. 1 may create an array of empty text lines, where each element of the array is assigned to a respective text line. After iterating through all the components in the sorted list as generated in connection with FIG. 2, line module 120 joins each connected component to an appropriate text line by adding the connected components to the element of the array assigned to the appropriate text line. By way of example, if a connected component in the sorted list meets specified joining criteria, e.g., minimum vertical overlap depicted in 310 and discussed in greater detail below, to join an existing text line, then it will be joined to the end of the existing text line, e.g., appended to the appropriate member of the array. However, if no such text line is found, then line module 120 will create a new text line for this component, e.g., by adding an element to the array for the new text line or assigning an existing unassigned element to the array. It will be appreciated that the above discussed array is intended to be illustrative in nature, and that any number of other data structures could be utilized in place of an array. This disclosure is not to be limited by the data structure utilized.

The joining criteria to join with an existing text line is illustrated in example 310. Such joining criteria can also be referred to herein as line joining criteria in an effort to distinguish from the previously discussed joining criteria. First, a right-most dimension of the last component (e.g., component 312) in the text line is compared with a left-most dimension of the new component (e.g., component 314). If there is vertical overlap, or if the amount of vertical overlap between these two dimensions exceeds a threshold of overlap, then the new component could be considered to be in the same text line as the last component. If there is no vertical overlap between these two dimensions of the last component and the new component, then the join criteria would fail. As depicted, component 312 and component 314 have a vertical overlap between the above discussed dimensions. As such, these components could be considered to be members of the same text line.

A second consideration takes into account the horizontal distance between the last component and the new component. If the horizontal distance between these two components is below a threshold of distance or falls within a predetermined range of distance, then the last component and the new component can be considered to be a part of the same text line. In various embodiments, the range or threshold can be determined via user input, heuristically determined, or determined in another suitable manner. In example 310, the horizontal distance (d) between component 312 and component 314 can be considered to be within the predetermined range. As such, component 314 will be joined to the existing text line with component 312.

By way of illustration, in example 320, component 328 is the first component in the sorted list, therefore, a new text line is created for it. Another new text line is created for component 322 because there is no vertical overlap between component 328 and component 322, as such, component 322 does not meet the joining criteria to join the existing text line to which component 328 is assigned. Similarly, another new text line is created for component 324 utilizing the same reasoning. However, component 326 meets the joining criteria for joining the text line to which component 324 is assigned. As such, component 326 joins component 324 in the same text line.

Figure 4:
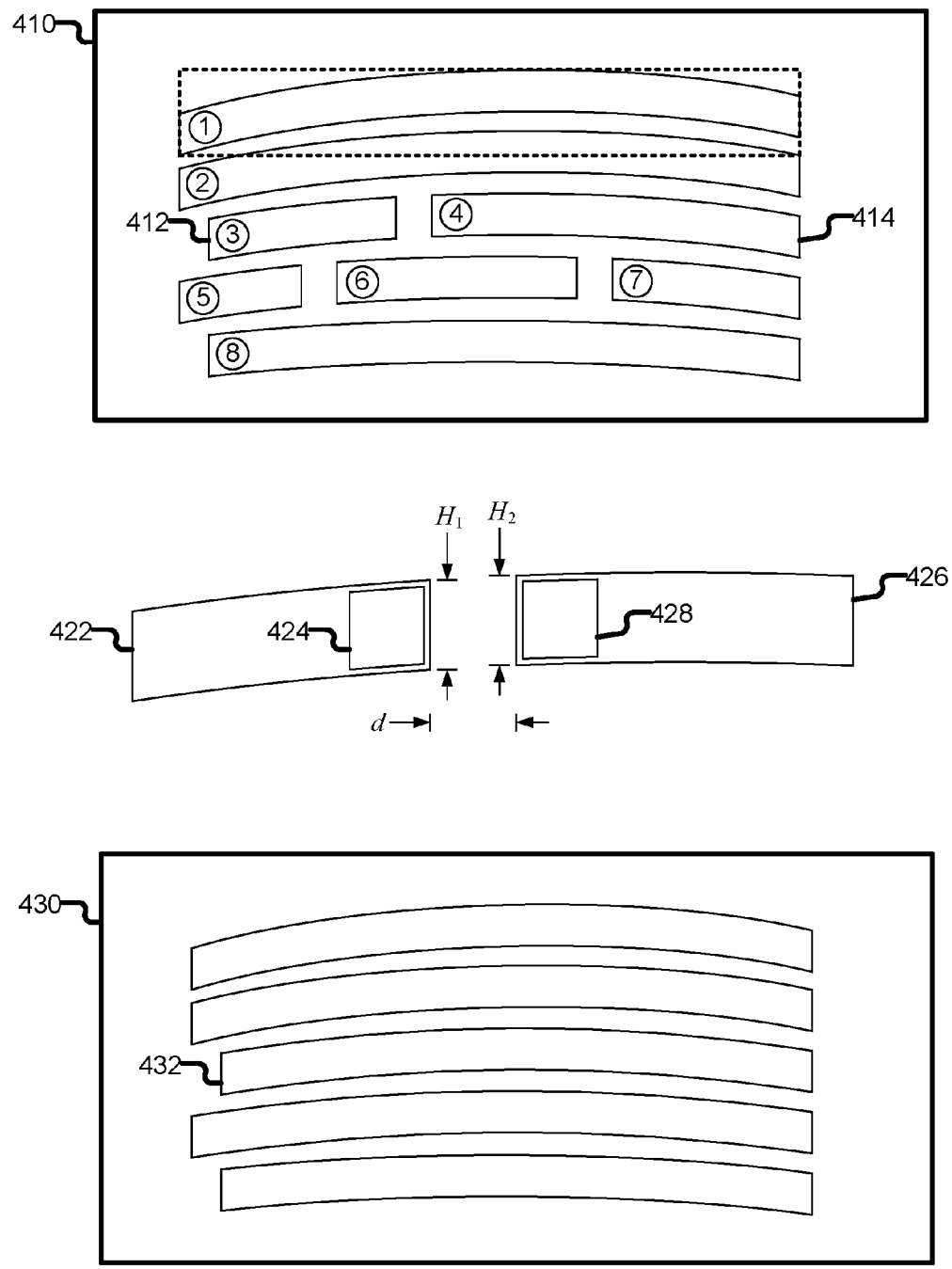
FIG. 4 is a schematic diagram illustrating an example for joining broken text lines, incorporating aspects of the present disclosure, in accordance with various embodiments.

FIG. 4 is a schematic diagram illustrating an example for joining a broken text line, incorporating aspects of the present disclosure, in accordance with various embodiments. In some instances, a text line may be broken into two or more parts, e.g., due to two adjacent components on the same text line being too far apart. In order to get smooth straightened content, it is helpful to join such broken lines. In this process, line module 120 of FIG. 1 can be configured to detect if a text line was broken into two or more parts and, if so, subsequently join the two or more parts if the joining criteria is met.

In box 410, multiple text lines are depicted, and a few text lines have been broken, e.g., due to large inter-component space. Line module 120 will form minimum enclosing bounds for each of the text lines. Next, line module 120 sorts these text lines in an order, e.g., a top-to-bottom and left-to-right order based on the top-left corners of their minimum enclosing bounds. Therefore, an ordered list of the text lines can be formed.

For each successive pair of text lines in this sorted list, line module 120 detects whether they are two broken lines. For example, pair (1, 2), pair (2, 3), pair (3, 4), etc. are examined to detect broken lines. In other words, for each of the pair of lines, line module 120 tries to determine if they can be joined to form a new line based on the joining criteria. As an example, text line 412 and text line 414 will be examined based on the joining criteria. If the joining criteria are met, text line 412 and text line 414 will be merged into a new text line.

The joining criteria are similar to those used while joining two components to form a text line. By way of example, text line 422 and text line 426 are examined. To satisfy the joining criteria, the distance between the two lines (d) should be a positive number and less than a threshold (t), which is determined by multiplying an experimentally determined constant k (e.g., 10) with average height of the two lines ($H_1$ and $H_2$) at the place of joining as shown in Eq. 1.

$$0 \le d \le k \cdot \frac{H1 + H2}{2} \qquad \text{Eq. 1}$$

Further, there should be vertical overlap between end rectangle 424 of text line 422 and start rectangle 428 of text line 426. In one embodiment, vertical overlap means the top of one text line is above the bottom of the other text line. In this example, text line 422 and text line 426 will be joined because they fulfill the above mentioned criteria.

After each pair of text lines are examined and joined when the joining criteria are met, page 410 turns to be page 430, in which, text line 412 joined with text line 414 to form a new text line 432.

FIG. 5 is a schematic diagram illustrating an example for forming vertical lines for a grid, incorporating aspects of the present disclosure, in accordance with various embodiments. In order to form a grid for piecewise perspective correction, correction module 130 of FIG. 1 can be configured to determine top and bottom anchor points. These anchor points can then be connected to create vertical grid lines. It will be appreciated that, although only 5 vertical grid lines are depicted in FIG. 5, for the sake of clarity, any number of grid lines can be utilized without departing from the scope of this disclosure. In addition, in various embodiments, the number of vertical grid lines can be determined based on a page size of the content, various heuristics, experiments to determine placement of grid lines, user preferences, etc.

Relating back to box 430 in FIG. 4, for each complete text line, line module 120 connects the midpoints of the start rectangles and end rectangles of each component in the text line to form a continuous curve for the entire text line. In some embodiments, line module 120 extrapolate a continuous curve, if needed. Further, line module 120 is configured to perform line smoothing on these curves, e.g., through a moving average filter. For example, the y-value of each point along the curve can be replaced by an average of a current points y value, and the y-values of an immediately preceding and immediately following point along the curve. As a result, in FIG. 5, line 532 is formed as a smooth curved line.

Next, correction module 130 of FIG. 1 estimates the straightened width of the curved content, and divide the width into equal length segments as shown in FIG. 5. By way of example, anchor point 512 and anchor point 522 are two end points of the top line. Similarly, anchor point 514 and anchor point 524 are two end points of the bottom line. For simplicity, only a few anchor points are shown on top and bottom. In various embodiments, any number of anchor points may be chosen depending on the application, e.g., the page width. Further, correction module 130 joins each vertically aligned pair of anchor points with straight lines, such as straight line 516 or straight line 526. These straight vertical lines function as the vertical lines for the grid for a piecewise perspective correction.

FIG. 6 is a schematic diagram illustrating an example for forming curved horizontal lines for the grid, incorporating aspects of the present disclosure, in accordance with various embodiments. The vertical lines of the grid will intersect with the smoothed curved lines, e.g., curved line 614. By way of example, curved line 614 intersects with vertical line 612 at intersection point 616. Correction module 130 will determine the intersection points, which will provide a definition of curved horizontal lines that conform to each of the text lines.

Curved horizontal lines for the grid can be formed by joining these intersection points. By way of example, intersection point 622 and intersection point 624 are joined with a straight line 626 between these two intersection points. However, the whole horizontal line may not result in a straight line because intermediate straight lines connecting the intersection points likely have different slopes, as depicted.

FIG. 7 is a schematic diagram illustrating an example piecewise perspective correction by mapping quadrilaterals between two grids, incorporating aspects of the present disclosure, in accordance with various embodiments. Here, the individual quadrilaterals formed in curved grid 710, via the above discussed straight vertical and curved horizontal lines, are mapped to rectangular sections on the squared grid 720. As used in the context squared grid merely refers to the vertical and horizontal lines of the grid being at perpendicular angles. By way of example, the curved content in quadrilateral 712 will be transformed to straightened content in quadrilateral 722.

In this way, correction module 130 conducts piecewise perspective correction of the whole curved page, and each of the quadrilaterals in the grid gets mapped to a corresponding rectangle in the final output image. In various embodiments, various image processing techniques may be used to transform the content of one quadrilateral of curved grid 710 to straightened content in a rectangle of squared grid 720.

Figure 8:
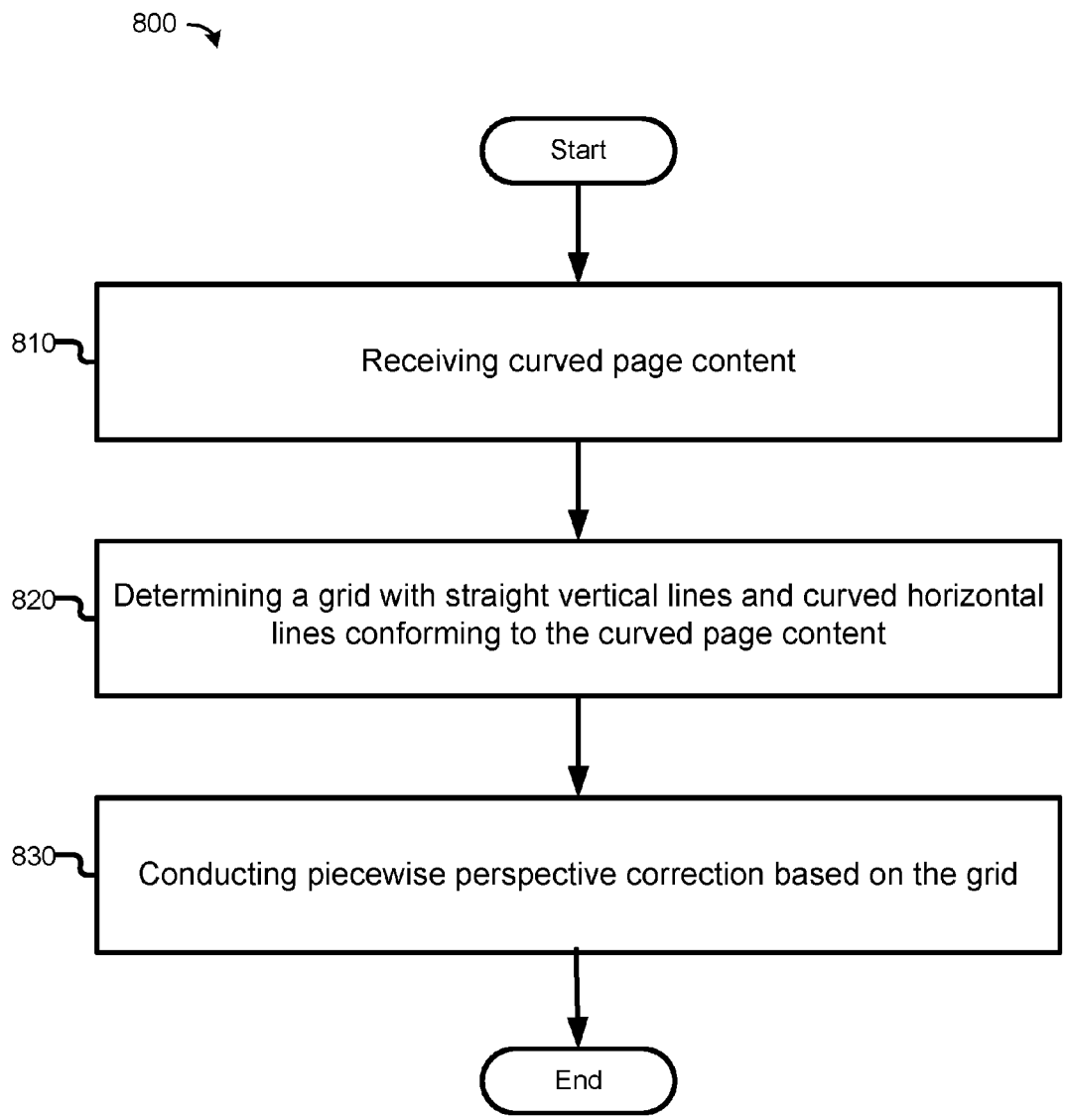
FIG. 8 is a flow diagram of an example process for straightening curved page content, incorporating aspects of the present disclosure, in accordance with various embodiments.

FIG. 8 is a diagram of an example process flow 800 for straightening curved content, in accordance with various embodiments of the present disclosure. Process flow 800 can be performed, for example, by page straightening system 100. Process 800 can be performed by processing logic that comprises hardware (e.g., circuitry, dedicated logic, programmable logic, microcode, etc.), software (e.g., instructions run on a processing device to perform hardware simulation), or a combination thereof. The processing logic can be configured to straighten curve textual content captured in an image. It will be appreciated that, in various embodiments, process flow 800 can have fewer or additional operations than those depicted, or perform some of the depicted operations in a different order without departing from the scope of this disclosure.

In various embodiments, the process begins at block 810, where curved page content is received by, e.g., image module 140 of FIG. 1. Such curved page content can be embodied in, for example, an image or a PDF file. The curved page content can be captured by any suitable image capture device, such as, for example, a camera on a mobile device (e.g., a smartphone). In embodiments, the curved page content is received upon interaction from a user of such a mobile device indicating that the user would like to have a content straightening process performed on the curved page content. In one embodiment, a user may simply submit the curved page content to, e.g., system 100 of FIG. 1 to trigger process 800.

At block 820, a grid with straight vertical lines and curved horizontal lines conforming to the curved page content is determined, e.g., by correction module 130 of FIG. 1. In various embodiments, in order to form a grid for piecewise perspective correction, top and bottom anchor points can be determined, as depicted in FIG. 5, above. These anchor points can then be joined to create vertical grid lines. The curved horizontal lines can then be formed for each complete text line by connecting the midpoints of the start rectangles and end rectangles of each component in the text line to form a continuous curve for the entire text line. In some embodiments, a continuous curve can be extrapolated, as mentioned previously, if needed. Further, line smoothing can be performed on these curves, e.g., through a moving average filter, as discussed previously. Next, the straightened width of the curved content can be estimated, and this estimated width can be divided into equal length segments as shown in FIG. 5. The result of this is a curved grid, similar to that depicted by curved grid 710 of FIG. 7.

Next, at block 830, piecewise perspective correction is applied to the curved content by mapping the quadrilaterals formed in the curved grid with rectangles of a squared grid, as discussed in reference to FIG. 7, above. As a result, the curved content is transformed into straight content.

Figure 9:
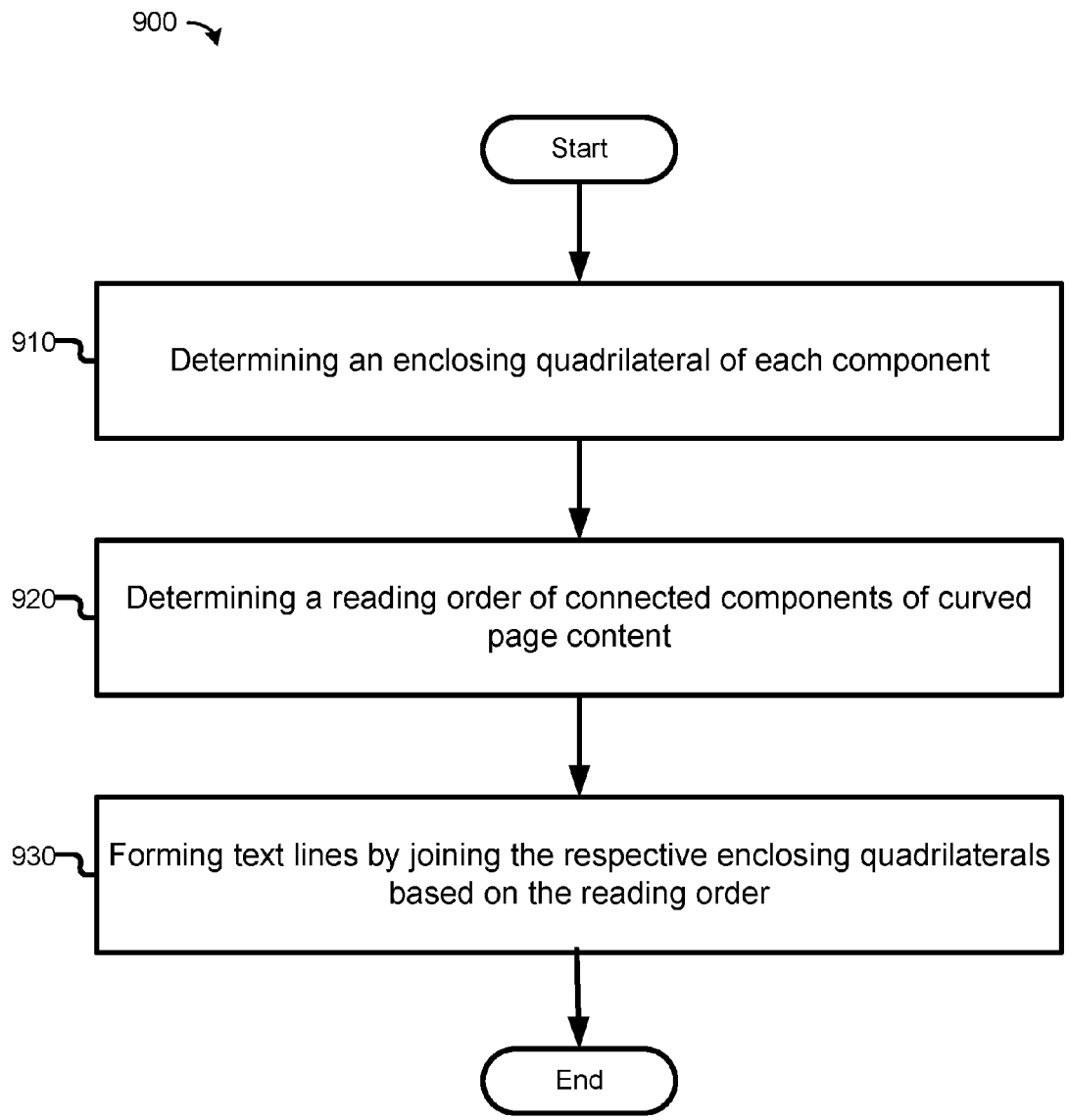
FIG. 9 is a flow diagram of an example process for forming text lines, incorporating aspects of the present disclosure, in accordance with various embodiments.

Referring now to FIG. 9, a flow diagram of an example process 900 for forming text lines, which is to be practiced by an example page straightening system in accordance with various embodiments, is provided. As shown, process 900 is to be performed by system 100 of FIG. 1 to implement one or more embodiments of the present disclosure. Similar to process 800, in various embodiments, process 900 has fewer or additional operations, or performs some of the operations in different orders.

At block 910, an enclosing quadrilateral of each component is formed, e.g., by word module 110 of FIG. 1. In various embodiments, connected-component analysis is used to detect connected regions in curved content. For each connected component, its enclosing quadrilateral may be determined. In some embodiments, an enclosing rectangle is determined for each component. In other embodiments, minimal enclosing quadrilateral is also determined for each component.

At block 920, a reading order of connected components of curved page content is determined, e.g., by line module 120 of FIG. 1. In some embodiments, to determine the reading order, the enclosing quadrilaterals are sorted in a left-to-right and top-to-bottom fashion, e.g., based on their top-left corners, as discussed in connection with FIG. 2.

At block 930, text lines are formed by joining the respective enclosing quadrilaterals based on the reading order, e.g., by line module 120 of FIG. 1. Each enclosing quadrilaterals can then be assigned to an appropriate text line, e.g., based on the joining criteria, as discussed in connection with FIG. 3. If an enclosing quadrilateral can be assigned to an existing text line based on the joining criteria, then the enclosing quadrilateral will be assigned to that existing text line. Otherwise, a new text line is created to host the enclosing quadrilateral, as discussed in connection with FIG. 3. If there are broken text lines, then they can be merged based on line merging criteria as discussed in connection with FIG. 4.

Figure 10:
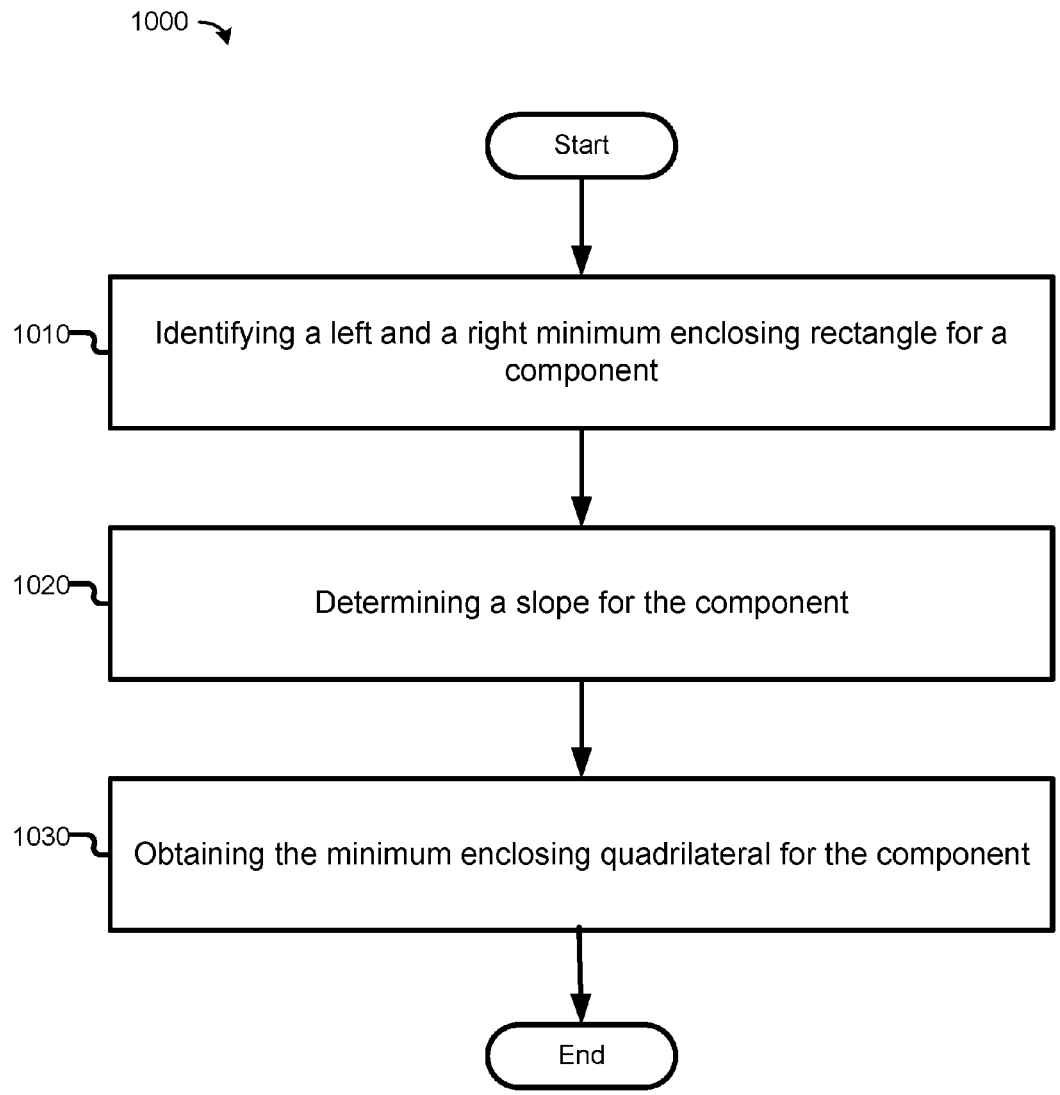
FIG. 10 is a flow diagram of an example process for analyzing components, incorporating aspects of the present disclosure, in accordance with various embodiments.

FIG. 10 is a flow diagram of an example process 1000 for analyzing components, which is to be practiced by an example page straightening system in accordance with various embodiments, is provided. As shown, process 1000 is to be performed by, e.g., system 100 of FIG. 1 to implement one or more embodiments of the present disclosure. Similar to process 900, in various embodiments, process 1000 has fewer or additional operations, or performs some of the operations in different orders.

At block 1010, a left and a right minimum enclosing rectangle for a component can be determined, e.g., by word module 110 of FIG. 1. A threshold (e.g., 10% of the width, or pixels, of the component) is used to define the left and a right minimum enclosing rectangle for a component. By way of example, a left minimum enclosing rectangle is defined for the left most 10% of the component, and a right minimum enclosing rectangle is defined for the right most 10% of the component.

At block 1020, a slope for the component is determined, e.g., by word module 110 of FIG. 1. In some embodiments, the slope of the component can be determined based on the line joining the center points of the left and right minimum enclosing rectangles. The slope of line 216 can be utilized for later processing, e.g., for curve smoothing based on the slope, for determining whether to join a component to an existing text line based on the slope, etc.

At block 1030, the minimum enclosing quadrilateral for the component is obtained, e.g., by word module 110 of FIG. 1. In various embodiments, the minimum enclosing quadrilateral for the component can be determined by joining the left and right minimum enclosing rectangles with straight lines.

Figure 11:
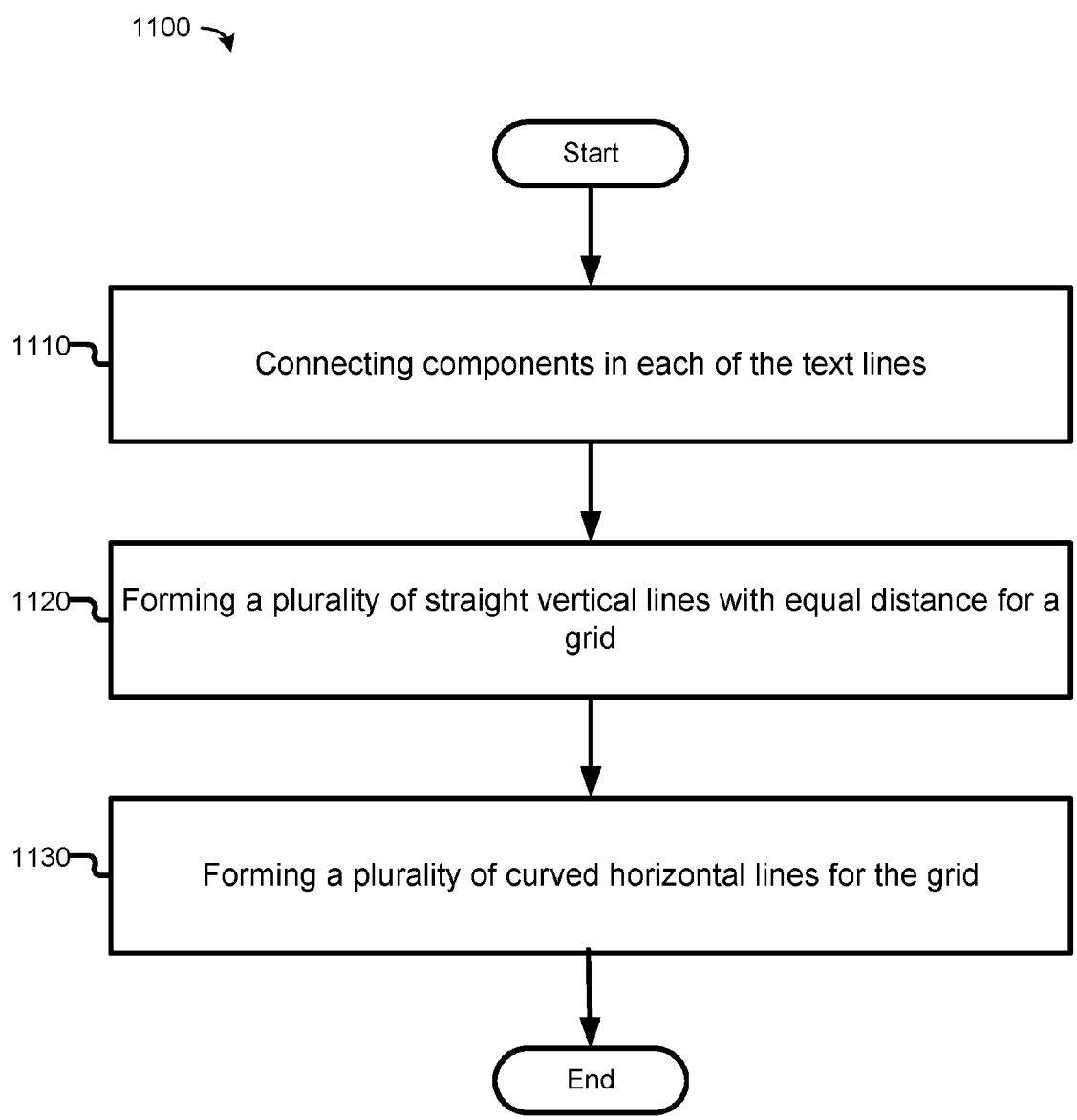
FIG. 11 is a flow diagram of an example process for forming a grid, incorporating aspects of the present disclosure, in accordance with various embodiments.

FIG. 11 is a flow diagram of an example process for forming a grid, which is to be practiced by an example page straightening system in accordance with various embodiments, is provided. As shown, process 1100 is to be performed by, e.g., system 100 of FIG. 1 to implement one or more embodiments of the present disclosure. Similar to process 1000, in various embodiments, process 1100 has fewer or additional operations, or performs some of the operations in different orders.

At block 1110, components in each of the text lines are connected, e.g., by line module 120 of FIG. 1. In some embodiments, the midpoints of an end of one component with a start of a horizontally adjacent component are connected with connecting lines. Extrapolation may be applied, when needed, to form a continuous curve for the entire text line. Further, line smoothing techniques may also be applied on these curves, e.g., utilizing a moving average, to smooth the continuous curve.

At block 1120, straight vertical lines are formed with equal distance for a grid used for piecewise perspective correction, e.g., by correction module 130 of FIG. 1. In some embodiments, equal numbers of top and bottom anchor points are determined. For example, a horizontal straight line can be used to connect the two end points of the top text line. Similarly, another horizontal straight line can be used to connect the two end points of the bottom text line. Then, both horizontal straight lines are divided into equal number of parts with anchor points. Each pair of anchor points on these horizontal straight lines can be connected with a vertical straight line. Accordingly, the vertical straight lines of the grid for piecewise perspective correction are formed.

At block 1130, curved horizontal lines for the grid for piecewise perspective correction are formed, e.g., by correction module 130 of FIG. 1. The vertical lines of the grid intersect with the smoothed curved lines conforming to the curved text lines. Those intersection points in the same text line can be joined to form curved horizontal lines that generally conform to the text lines, thus serving as the curved horizontal lines for the grid for piecewise perspective correction. Once the grid is formed, each quadrilateral in the grid can be mapped to a corresponding quadrilateral in a straight grid. In this way, the curved content is straightened.

Figure 12:
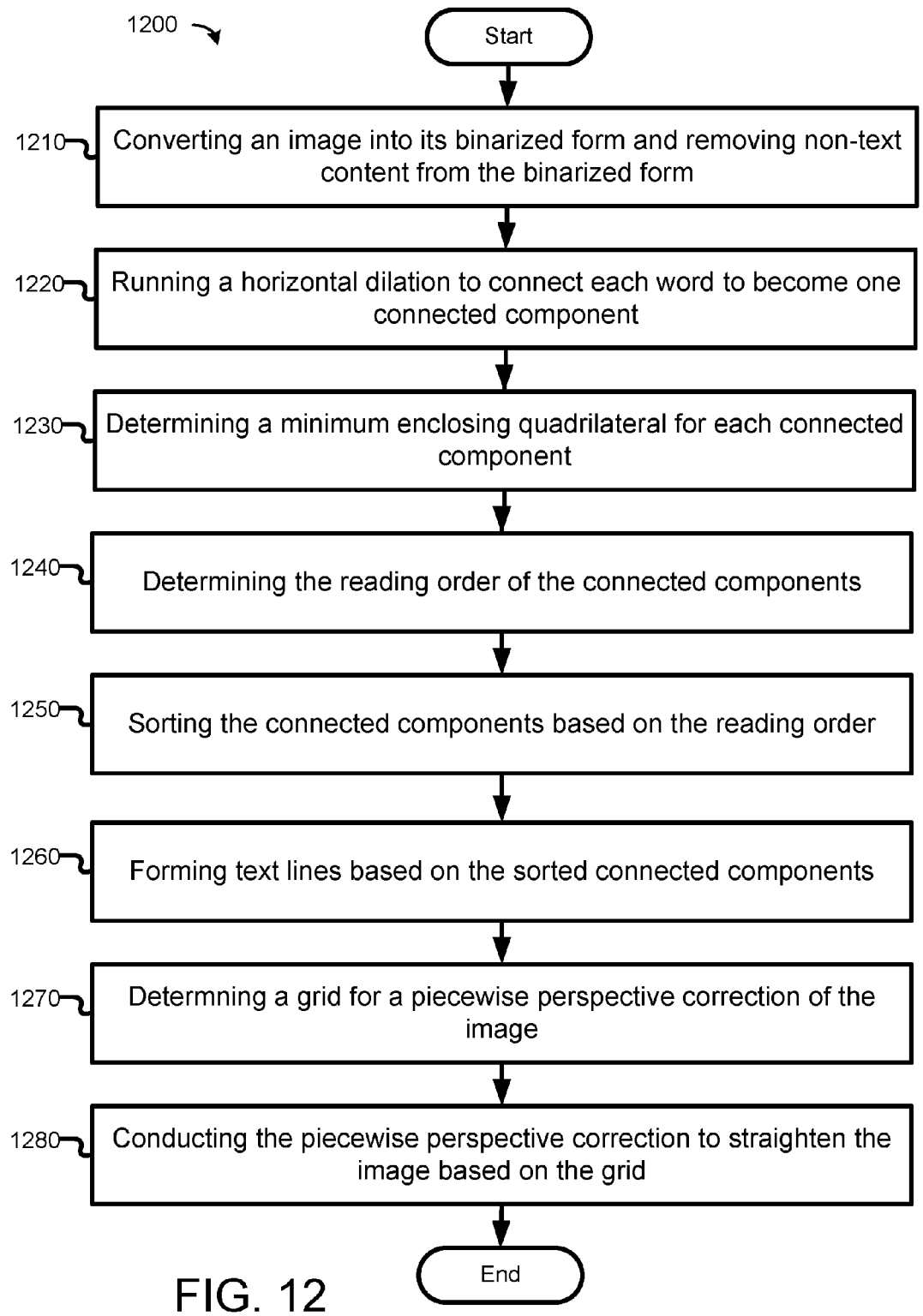
FIG. 12 is a flow diagram of an example process for straightening curved page content, incorporating aspects of the present disclosure, in accordance with various embodiments.

FIG. 12 is a diagram of an example process flow 1200 for straightening curved content, in accordance with various embodiments of the present disclosure. Process flow 1200 can be performed, for example, by page straightening system 100. Process 1200 can be performed by processing logic that comprises hardware (e.g., circuitry, dedicated logic, programmable logic, microcode, etc.), software (e.g., instructions run on a processing device to perform hardware simulation), or a combination thereof. The processing logic can be configured to straighten curve textual content captured in an image. It will be appreciated that, in various embodiments, process flow 1200 can have fewer or additional operations than those depicted, or perform some of the depicted operations in a different order without departing from the scope of this disclosure.

At block 1210, the page straightening system converts an image into its binarized form and removes non-text content from the binarized form. At block 1220, the page straightening system runs a horizontal dilation filter to connect each word to become one connected component. At block 1230, the page straightening system determines a minimum enclosing quadrilateral for each connected component. At block 1240, the page straightening system determines a reading order of the connected components. At block 1250, the page straightening system sorts the connected components based on the reading order. At block 1260, the page straightening system forms text lines based on the sorted connected components. At block 1270, the page straightening system determines a grid for a piecewise perspective correction of the image. At block 1280, the page straightening system conducts a piecewise perspective correction to straighten the image based on the grid.

Figure 13:
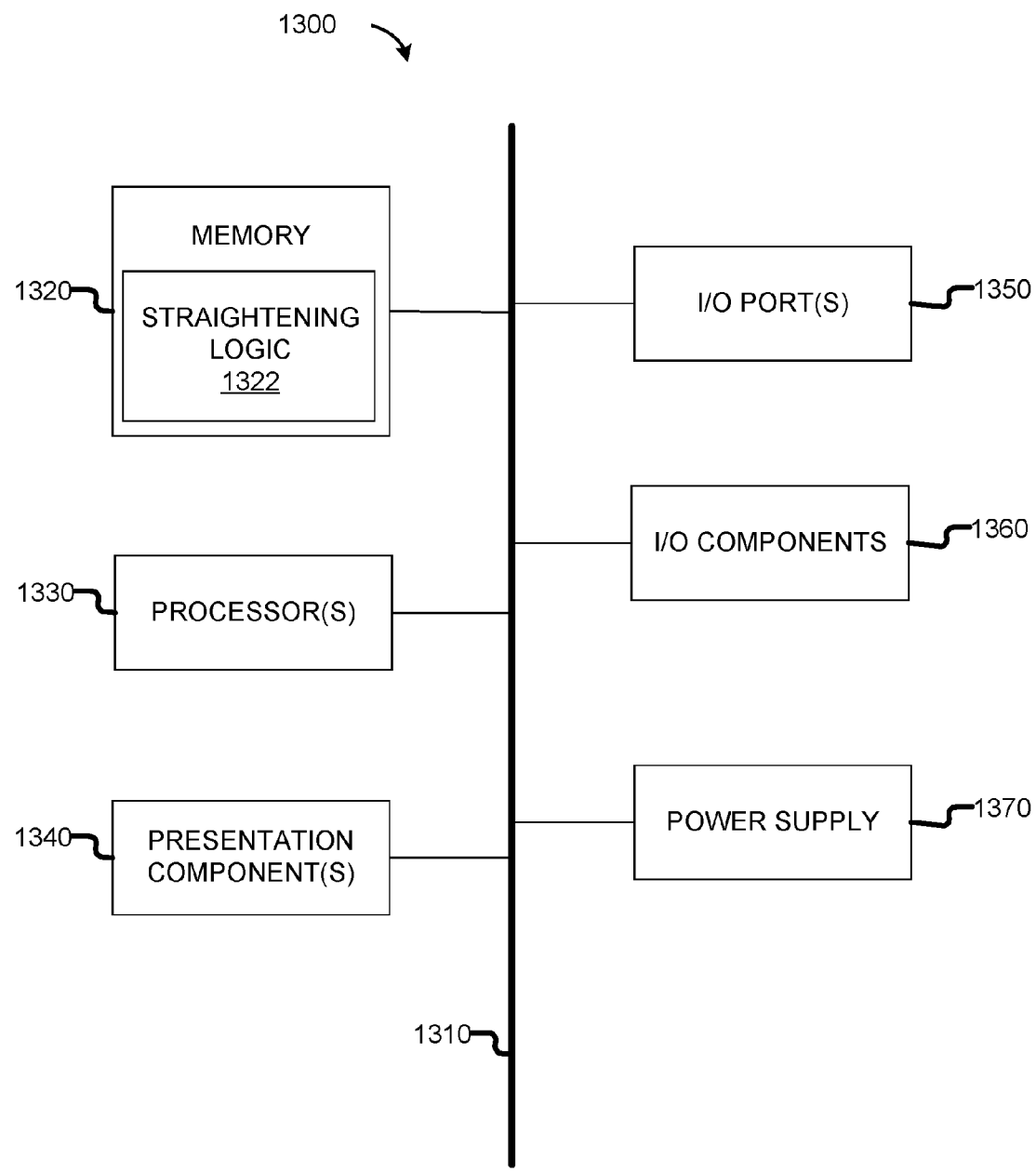
FIG. 13 illustrates an example computing device suitable for practicing the disclosed embodiments, in accordance with various embodiments.

Having briefly described an overview of embodiments of the present invention, an exemplary operating environment in which embodiments of the present invention is to be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The disclosure is described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 13, computing device 1300 includes a bus 1310 that directly or indirectly couples the following devices: memory 1320, one or more processors 1330, one or more presentation components 1340, input/output (I/O) ports 1350, input/output (I/O) components 1360, and an illustrative power supply 1370. Bus 1310 represents one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, a presentation component includes a display device also serves as an I/O component. Also, processors have memory. The inventor recognizes that such is the nature of the art, and reiterates that the diagram of FIG. 13 is merely illustrative of an exemplary computing device that is used in connection with one or more embodiments of the present invention. Distinction is not made between such categories as "workstation," "server," "laptop," "handheld device," etc., as all are contemplated within the scope of FIG. 13 and reference to "computing device."

Computing device 1300 typically includes a variety of computer-readable media. Computer-readable media include any available media that to be accessed by computing device 1300, and include both volatile and nonvolatile media, and removable and non-removable media. By way of example, and not limitation, computer-readable media comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1320 includes computer-storage media in the form of volatile and/or nonvolatile memory. In various embodiments, the memory is removable, non-removable, or a combination thereof. Exemplary hardware devices include solid-state memory, hard drives, optical-disc drives, etc. Computing device 1300 includes one or more processors that read data from various entities such as memory 1320 or I/O components 1360. Presentation component(s) 840 present data indications to a user or other device. Exemplary presentation components include a display device, speaker, printing component, vibrating component, etc.

In various embodiments, memory 1320 includes, in particular, temporal and persistent copies of straightening logic 1322. Straightening logic 1322 includes instructions that, when executed by one or more processors 1330, result in computing device 1300 providing sky editing capability on an image, such as, but not limited to, process 800, process 900, process 1000, or process 1100. In various embodiments, straightening logic 1322 includes instructions that, when executed by processors 1330, result in computing device 1300 performing various functions associated with, such as, but not limited to, word module 110, line module 120, correction module 130, or image module 140, in connection with FIG. 1.

In some embodiments, one or more processors 1330 are to be packaged together with straightening logic 1322. In some embodiments, one or more processors 1330 are to be packaged together with straightening logic 1322 to form a System in Package (SiP). In some embodiments, one or more processors 1330 are integrated on the same die with straightening logic 1322. In some embodiments, processors 1330 is integrated on the same die with straightening logic 1322 to form a System on Chip (SoC).

I/O ports 1350 allow computing device 1300 to be logically coupled to other devices including I/O components 1360, some of which are built in components. Illustrative components include a microphone, joystick, game pad, satellite dish, scanner, printer, wireless device, etc. In some embodiments, the I/O components 1360 also provide a natural user interface (NUI) that processes air gestures, voice, or other physiological inputs generated by a user. In some embodiments, inputs are to be transmitted to an appropriate network element for further processing. An NUI implements any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 is equipped with depth cameras, such as stereoscopic camera systems, infrared camera systems, RGB camera systems, touchscreen technology, and combinations of these, for gesture detection and recognition. Additionally, the computing device 1300 is equipped with accelerometers or gyroscopes that enable detection of motion. The output of the accelerometers or gyroscopes is to be provided to the display of the computing device 1300 to render immersive augmented reality or virtual reality.

Although certain embodiments have been illustrated and described herein for purposes of description, a wide variety of alternate and/or equivalent embodiments or implementations calculated to achieve the same purposes are to be substituted for the embodiments shown and described without departing from the scope of the present disclosure. This application is intended to cover any adaptations or variations of the embodiments discussed herein. Therefore, it is manifestly intended that embodiments described herein be limited only by the claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. One or more computer storage media comprising computer-implemented instructions that, when used by one or more computing devices, cause the one or more computing devices to:
   receive curved page content;
   determine a grid with a plurality of straight vertical lines connecting respective top and bottom anchor points, and with a plurality of curved horizontal lines conforming to the curved page content;
   generate another grid with straight vertical lines and straight horizontal lines;
   map respective quads in the grid to corresponding quads in the another grid; and
   conduct piecewise perspective correction based on the grid to generate straightened page content at the another grid from the curved page content.

2. The one or more computer storage media of claim 1, the instructions further cause the one or more computing devices to:
   binarize the curved page content; and
   remove noise and non-text content from the curved page content based on a connected component analysis.

3. The one or more computer storage media of claim 1, the instructions further cause the one or more computing devices to:
   use a hysteresis binarization technique to binarize the curved page content.

4. The one or more computer storage media of claim 1, the instructions further cause the one or more computing devices to:
   rotate the curved page content to obtain a horizontal reading pattern.

5. The one or more computer storage media of claim 1, the instructions further cause the one or more computing devices to:
   dilate the curved page content in a horizontal direction to connect glyphs within respective words on the curved page content; and
   identify the respective words based on a connected component analysis.

6. The one or more computer storage media of claim 1, the instructions further cause the one or more computing devices to:
   identify a plurality of connected components based on a connected component analysis; and
   determine a minimum enclosing quadrilateral of a component of the plurality of connected components.

7. The one or more computer storage media of claim 6, the instructions further cause the one or more computing devices to:
   identify a left minimum enclosing rectangle for left-most pixels with a predetermined width threshold and a right minimum enclosing rectangle for right-most pixels with the predetermined width threshold; and
   join the first and second minimum enclosing rectangles with straight lines to obtain the minimum enclosing quadrilateral of the component.

8. The one or more computer storage media of claim 6, the instructions further cause the one or more computing devices to:
   determine a reading order of the plurality of connected components; and
   form text lines by joining the plurality of connected components by connectors based on the reading order.

9. The one or more computer storage media of claim 8, the instructions further cause the one or more computing devices to:
   create a sorted list of the plurality of connected components with a left-to-right and top-to-bottom order according to their top-left corners; and
   add a component from the sorted list to a text line when the component has vertical overlap with a last component of the text line, and a distance between the component and the last component of the text line is within a predetermined range.

10. The one or more computer storage media of claim 8, the instructions further cause the one or more computing devices to:
    connect components in each line of the text lines with respective continuous curved lines;
    create the plurality of straight vertical lines with equal distance;
    intersect the plurality of straight vertical lines with the respective continuous curved lines to form a plurality of intersection points; and
    form the plurality of curved horizontal lines based on the plurality of intersection points.

11. A computer-implemented method, comprising:
    determining a reading order of a plurality of connected components of curved page content;
    forming text lines from the plurality of connected components based on the reading order;
    determining a grid based on the text lines and straight vertical lines connecting respective top and bottom anchor points on two different text lines;
    generating another grid with a plurality of straight vertical lines and a plurality of straight horizontal lines;
    mapping respective quads in the grid to corresponding quads in the another grid; and
    conducting piecewise perspective correction based on the grid to generate straightened page content at the another grid from the curved page content.

12. The method of claim 11, further comprising:
    identifying the plurality of connected components based on a connected component analysis with the curved page content; and
    determining a minimum enclosing quadrilateral of a component of the plurality of connected components.

13. The method of claim 12, further comprising:
    identifying a left minimum enclosing rectangle for left-most pixels of the component based on a predetermined width;

identifying a right minimum enclosing rectangle for right-most pixels of the component based on the predetermined width; and obtaining the minimum enclosing quadrilateral of the component by joining the left and right minimum enclosing rectangles with straight lines.

14. The method of claim 11, further comprising:

connecting components in each line of the text lines with respective continuous curved lines;

creating a plurality of straight vertical lines with equal distance in the grid;

intersecting the plurality of straight vertical lines with the respective continuous curved lines to form a plurality of intersection points; and forming a plurality of curved horizontal lines in the grid based on the plurality of intersection points.

15. A system, comprising:

a processor;

a word module, coupled to the processor, to determine an enclosing quadrilateral of each component of a plurality of connected components of curved content;

a line module, coupled to the word module, to form text lines by joining the respective enclosing quadrilaterals based on a reading order of the plurality of connected components; and a correction module, coupled to the line module, to generate straightened content from the curved content based on the text lines, wherein the correction module is further to conduct piecewise perspective correction based on a grid with a plurality of straight vertical lines connecting respective top and bottom anchor points on two different text lines and a plurality of curved horizontal lines conforming to the text lines.

16. The system of claim 15, wherein the word module is further to identify a left minimum enclosing rectangle for left-most pixels and a right minimum enclosing rectangle for right-most pixels of a component of the plurality of connected components based on a predetermined width threshold, and obtain a minimum enclosing quadrilateral of the component based on the left and right minimum enclosing rectangles.

17. The system of claim 15, wherein the line module is further to create a sorted list of the plurality of connected components; and add a component from the sorted list to a text line when the component has vertical overlap with a last component of the text line.

* * * * *